United States Patent
Adams et al.

(10) Patent No.: US 7,925,731 B2
(45) Date of Patent: Apr. 12, 2011

(54) SYSTEM AND METHOD FOR PROVIDING SNMP DATA FOR VIRTUAL NETWORKING DEVICES

(75) Inventors: Tracy Jo Adams, Endicott, NY (US); Mary Ellen Carollo, Ithaca, NY (US); Susan Marie Farrell, Binghamton, NY (US); Joseph Michael Hust, Glen Aubrey, NY (US); Angelo Macchiano, Apalachin, NY (US); Dennis Ray Musselwhite, Hallstead, PA (US)

(73) Assignee: International Business Machines Corporation, Armonk, NY (US)

(*) Notice: Subject to any disclaimer, the term of this patent is extended or adjusted under 35 U.S.C. 154(b) by 560 days.

(21) Appl. No.: 11/610,404

(22) Filed: Dec. 13, 2006

(65) Prior Publication Data

US 2008/0147833 A1   Jun. 19, 2008

(51) Int. Cl.
G06F 15/16 (2006.01)
G06F 15/173 (2006.01)

(52) U.S. Cl. ........................ 709/223; 709/217

(58) Field of Classification Search .............. 709/223, 709/224, 217
See application file for complete search history.

(56) References Cited

U.S. PATENT DOCUMENTS

| | | | |
|---|---|---|---|
| 6,181,679 B1 | 1/2001 | Ashton et al. | |
| 6,398,105 B2* | 6/2002 | Ramberg et al. | 235/375 |
| 6,539,540 B1* | 3/2003 | Noy et al. | 717/141 |
| 6,789,114 B1* | 9/2004 | Garg et al. | 709/224 |
| 2002/0069369 A1* | 6/2002 | Tremain | 713/201 |
| 2002/0116544 A1* | 8/2002 | Barnard et al. | 709/324 |
| 2004/0054768 A1 | 3/2004 | Valipirti et al. | |
| 2004/0122944 A1* | 6/2004 | Poirot et al. | 709/224 |
| 2005/0066016 A1* | 3/2005 | Bailey et al. | 709/220 |
| 2005/0198371 A1* | 9/2005 | Smith et al. | 709/238 |
| 2005/0251782 A1* | 11/2005 | Rodrigues et al. | 717/100 |
| 2006/0026301 A1* | 2/2006 | Maeda et al. | 709/246 |
| 2006/0075123 A1 | 4/2006 | Burr et al. | |
| 2006/0095584 A1 | 5/2006 | Deolaliker et al. | |
| 2006/0101138 A1 | 5/2006 | Son | |
| 2007/0233886 A1* | 10/2007 | Fan | 709/230 |

FOREIGN PATENT DOCUMENTS

KR   0018244   4/2000

OTHER PUBLICATIONS

IBM, "CP Exit Customization", Dec. 2005, IBM Corporation, Second Edition, Chapters 1 and 4, pp. 1-6 and 37-44.*
Carpenter, G. et al., "RFC 1228: SNMP-DPI Simple Network Management Protocol, Distributed Program Interface", May 1991.*
Wind River Systems, Inc., "WindNet SNMPv1/v2c: Component Release Supplement", 1999, Wind River Systems, Inc., Edition 2, section 4.12, "http://www-kryo.desy.de/documents/vxWorks/V5.4/snmp/supplement/".*

* cited by examiner

*Primary Examiner* — Larry Donaghue
*Assistant Examiner* — Brian J Gillis
(74) *Attorney, Agent, or Firm* — Dennis Jung; Roberts Mlotkowski Safran & Cole, P.C.

(57) ABSTRACT

A system and method of managing networks and, more particularly, to a system and method for interfacing with virtual networking devices using SNMP (Simple Network Management Protocol). A system comprises a configuration statement configured to provide an identity to a virtual device. An SNMP subagent is configured to interface between an SNMP agent and a control program of the virtual device. The SNMP subagent acquires information extracted by the control program for the identified virtual device and provides the acquired information to the SNMP agent to be returned to the SNMP client.

24 Claims, 5 Drawing Sheets

SYSTEM AND METHOD FOR PROVIDING SNMP DATA FOR VIRTUAL NETWORKING DEVICES

FIELD OF THE INVENTION

The invention generally relates to a system and method of managing networks and, more particularly, to a system and method for interfacing with virtual networking devices using SNMP (Simple Network Management Protocol).

BACKGROUND OF THE INVENTION

The Simple Network Management Protocol (SNMP) was developed in 1988 and has become a de facto standard for managing networks. In particular, the SNMP includes an application layer protocol that facilitates the exchange of management information between network devices and, as such, enables network administrators to manage network performance, amongst other tasks. The SNMP is also part of the Transmission Control Protocol/Internet Protocol (TCP/IP) protocol suite, thus allowing systems to be managed over the Internet, for example.

An SNMP-managed network has three main components including (i) managed devices, (ii) agents, and (iii) network-management systems (NMSs). The managed devices, also called network elements, may include any number of hardware devices such as, for example, routers, switches and bridges, hubs, computer hosts, printers, etc. In implementation, the managed devices collect and store management information and make this information available to NMSs using SNMP. The agent has local knowledge of management information and translates such information into a form compatible with SNMP.

SNMP has several basic commands for managing a network including four basic SNMP commands for monitoring and controlling managed devices. These basic SNMP commands include read, write, trap, and traversal operations. The NMS uses the read command to monitor the managed devices. The NMS uses the write command to control the managed devices. The NMS uses traversal operations to determine which variables a managed device supports and to sequentially gather information in variable tables, such as a routing table. The managed devices use the trap command to asynchronously report events to the NMS, for example.

The SNMP also includes a Management Information Base (MIB). A MIB is a hierarchical collection of information which is accessed using a network-management protocol such as SNMP. The MIBs include managed objects identified by object identifiers. A managed object (a MIB object) can include specific characteristics of a managed device. An object identifier (or object ID) uniquely identifies a managed object in the MIB hierarchy. Vendors can define private branches that include managed objects for their own hardware devices.

RFC 1493 (Definitions of Managed Objects for Bridges) defines a portion of the MIB for use with network management protocols in TCP/IP based networks. These objects are known as the SNMP BRIDGE-MIB and are used by network management systems to manage bridging devices (e.g., devices that connect LAN segments below the network layer). These devices may be, for example, "real" switches (i.e., hardware devices).

The hardware switches have IP addresses so that it can be identified by the management system. That is, the hardware switches have native TCP/IP communications to deploy to receive and send management information (SNMP BRIDGE-MIB data) with network management stations. This allows the network manager the ability to connect to the hardware switches and manage the switches using the SNMP protocol to obtain the BRIDGE-MIB information that is defined by RFC 1493. Thus, the hardware switches are capable of being managed through the use of an industry standard network management (SNMP).

On the other hand, virtual switches are fully simulated devices. These simulated devices have no presence (identity) on the physical network. Thus, unlike hardware switches, a virtual switch, for example, has no native TCP/IP communications to deploy to receive and send management information (SNMP BRIDGE-MIB data) with network management stations. Today, only through the intervention of an administrator who is logged onto the virtual system can such information about the virtual device be presented using a CP QUERY command line interface.

Accordingly, there exists a need in the art to overcome the deficiencies and limitations described hereinabove.

SUMMARY OF THE INVENTION

In a first aspect of the invention, a system comprises a HOME configuration statement configured to provide an identity to a virtual device. An SNMP subagent is configured to interface between an SNMP agent and a control program of the virtual device. The SNMP subagent acquires information extracted by the control program implementing the virtual device and provides the acquired information to the SNMP agent.

In another aspect of the invention, a method for deploying an application for managing a virtual device is provided. The method comprises providing a computer infrastructure being operable to request information from a control program about a virtual device implemented by that control program. The computer infrastructure is further operable to extract information about the identified virtual device obtained by the control program and create an SNMP response packet with pertinent information and send the response to an SNMP agent.

In another aspect of the invention, a computer program product comprising a computer usable medium having readable program code embodied in the medium is provided. The computer program product includes at least one component to perform the functions of the computer infrastructure.

DETAILED DESCRIPTION OF EMBODIMENTS OF THE INVENTION

The invention generally relates to a system and method of managing networks and, more particularly, to a system and method for interfacing with virtual networking devices using SNMP (Simple Network Management Protocol). More specifically, in embodiments, the system and method of the invention provides an interface between an SNMP network management system and a virtual device such as, for example, a virtual switch. By using the system and method of the invention, a virtual device can be identified and pertinent information provided to an NMS over TCP/IP. In this way, the need for intervention by an administrator logged onto the virtual system can be eliminated.

In one embodiment, the system and method is configured to run on z/VM operating systems from International Business Machines Corporation. At its core, the z/VM is a "hipervisor"; that is, z/VM is a system that virtualizes the real hardware environment. This function allows an individual, virtual environment to be created for anything that runs on the computer. In operation, z/VM controls all the hardware, memory and processors, giving out resources to its "guests" as they need them. This allows many systems or services to share the same resources. Of course, those of skill in the art should understand that the system and method of the invention is also configured to run on other operating systems.

System Environment

Figure 1:
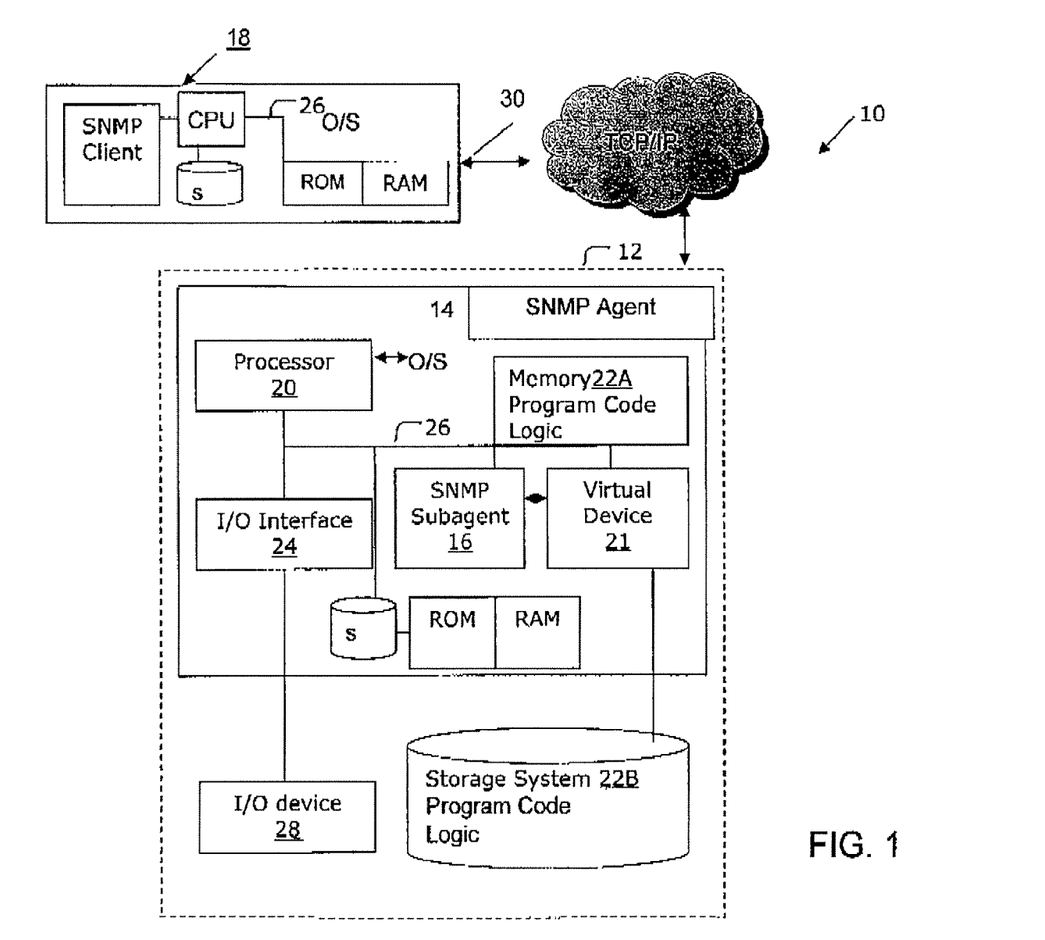
FIG. 1 shows an illustrative environment in accordance with the invention.

FIG. 1 shows an illustrative environment 10 for managing the processes in accordance with the invention. The illustrative environment may be a server or a user workstation, for example. The environment 10 includes a computer infrastructure 12 having a computing device 14 (e.g., including the SNMP Agent). More specifically, the computing device 14 includes an SNMP agent which accepts SNMP requests for data over a network connection, an SNMP subagent 16 which acts as an extension of the SNMP agent and as an interface between the agent and the program code (e.g., an Assembler Diagnose programming interface) of the control program implementing a virtual device 21. In one embodiment, the SNMP subagent 16 extracts the necessary information from the control program (of the virtual device) and converts this information into a meaningful response to a MIB request. This allows outside clients to identify and target a virtual device through an existing TCP/IP server virtual machine.

The control program, configuration files, etc. may be stored temporarily or permanently in a memory 22A or storage system 22B. As should be understood by those of skill in the art, the control program may provide information about the virtual device such as, for example, the type of bridge, number of ports. As discussed in greater detail below, the program code acts as an interface between the control program implementing a virtual device and the SNMP subagent 16. The memory 22A can include local memory employed during actual execution of program code, bulk storage, and cache memories which provide temporary storage of at least some program code in order to reduce the number of times code must be retrieved from bulk storage during execution.

The control program 14 further includes a processor 20, an input/output (I/O) interface 24, a bus 26, Storage "S", ROM, RAM and an external I/O device/resource 28. The control program 14 also includes an operating system O/S, which may be, in one non-limiting illustration, z/VM operating systems from International Business Machines Corporation. The external I/O device/resource 28 may be a keyboard, display, pointing device, or any device that enables the control program 14 to communicate with one or more other computing devices using any type of communications link 30. In embodiments, the SNMP subagent 16 uses an architected interface (i.e., distributed programming interface) to communicate back and forth with the SNMP client 18 and computing device via communications link 30. The communications link 30 can be, for example, wired and/or wireless links; one or more types of networks (e.g., the Internet, a wide area network, a local area network, a virtual private network, etc.); and/or any known transmission techniques and protocols such as, for example, TCP/IP.

The processor 20 executes the computer program code and logic of the SNMP subagent 16, which is stored in the memory 22A and/or storage system 22B. While executing the computer program code, etc., the processor 20 can read and/or write data to/from the memory 22A, storage system 22B, and/or I/O interface 24. The bus 26 provides a communications link between each of the components in the computing device 14.

In embodiments, the SNMP subagent 16 provides an extension to the functionality that is provided by the SNMP client 18; that is, the SNMP subagent 16 is configured to handle requests for BRIDGE-MIB data for the virtual device 21 with minimal impact to the existing SNMP client 18.

The SNMP subagent 16 is configured to communicate with the SNMP agent 14 and register itself for handling BRIDGE-MIB variables for the virtual device 21. Thus, in operation, the SNMP client 18 will send requests to the SNMP subagent 16 for BRIDGE-MIB variables for an IP address associated with the virtual device 21. In embodiments, the MIB data returned will follow the architecture outlined in RFC 1493—Definitions of Managed Objects for Bridges, which will allow network management stations to use the information to manage the virtual devices. Thus, the SNMP subagent 16 builds a compliant response (e.g., RFC 1493 compliant response) to requests for the virtual device BRIDGE-MIB information.

In addition, as an interface, the SNMP subagent 16 communicates with the control program implementing the virtual device 21. The control program is configured to extract information about the virtual device 21 which, in turn, is provided to the SNMP subagent 16. More specifically, the SNMP subagent 16 retrieves information about the virtual networking objects (devices) from the control program using interfaces typically written in assembly code.

The system and method of the invention is further configured to provide the virtual device 21 with a meaningful identity (management IP address) through an existing TCP/IP server virtual machine. This identity allows SNMP client 18 to identify and target the virtual device 21, e.g., a virtual switch. The SNMP client 18 may include, for example, a processor, ROM, RAM, a storage unit and an operating system, as should be understood by those of skill in the art. A bus 26 provides a communications link between each of the components in the SNMP client 18. The association between the management IP address (for identifying the virtual device) may be created in the TCP/IP configuration file using a "HOME" statement with a new keyword. More specifically, the virtual device can be identified by a unique IP address created as a keyword in the HOME statement in the TCP/IP configuration file in the stack that is servicing SNMP requests. For example, the "HOME" statement in the configuration file may be:

"HOME ipv4addr netmask VSWITCH switchname linkname"

The HOME TCP/IP configuration statement should be configured on the stack of the SNMP service providing the Bridge MIBs. Also, the HOME TCP/IP configuration statement that specifies a virtual device name can be coded for an IPv4 (or IPv6) address and may be comparable to the TELNET address for a hardware device. Also, the HOME TCP/IP configuration statement is not necessarily related to the switch network, but is an IP address used for switch management purposes.

The network connecting the TCP/IP stacks to the NMS should be separate from the virtual device connection to the external network, so that a failure of the virtual device connection can be reported to the NMS using SNMP traps.

By using the HOME statement, the computing system 14 is configured with the ability to describe the virtual device 21. Thus, when a MIB request is received over SNMP using the switch management IP address, the logic in the SNMP subagent 16 communicates with the control program and builds a MIB response. The SNMP subagent uses an assembler interface to extract information about the virtual device from the control program. More specifically, the SNMP subagent 16 retrieves information about the virtual networking objects (devices) from the control program using interfaces typically written in assembly code. The extracted information is returned to the SNMP agent 14. This capability is, in embodiments, provided through subcodes on the "DIAGNOSE" code (e.g., DIAGNOSE code X'26C' (Access Certain System Information)), which can be programmed in any language such as C, and which can be implemented by a programmer having ordinary skill in the art.

The SNMP subagent 16 may be written using the SNMP Agent Distributed Programming Interface that is documented in SC24-5083, TCP/IP Programmer's Reference, as well as in RFC 1228—SNMP-DPI: Simple Network Management Protocol Distributed Program Interface. The SNMP subagent 16 preferably resides in its own virtual machine and communicates with the current SNMP client 18 over a TCP port, via the SNMP agent, for example.

TCP/IP Administrator

A TCP/IP administrator provides interfaces to update the TCP/IP HOME statement to associate a virtual device name with the IPv4 address, specifying that the stack is providing management services such as SNMP for a virtual switch. In addition, the TCP/IP administrator uses the CP QUERY VSWITCH command to display the virtual device identity and the name of the TCP/IP stack providing SNMP services. Moreover, the TCP/IP administrator defines a set of MIB variables to the SNMP subagent 16, as well as the name of an exit routine that will provide the response data when any of the defined MIB variables are requested. In addition, the TCP/IP administrator may define a MACID for the virtual device using SET VSWITCH or MODIFY VSWITCH.

SNMP Subagent

The SNMP subagent 16 is extendable to support additional sets of MIB information by providing a new exit routine that uses the interface and then adds that exit name and a list of the MIB variables it supports to the subagent configuration file. Thus, to add future subagents that support additional sets of MIB variables, the SNMP subagent 16 is implemented in a generic manner.

To keep the SNMP subagent 16 generic, the the MIB variables are provided to the subagent 16 in an external file along with the name of an exit routine that will actually build the MIB response packet. The generic subagent will read the MIB data file, register for the specified MIB variables in order to let the SNMP server know which MIB variable requests it will be handling, and keep track of what exit routine is to be called to handle those MIB variables. When a GET request comes into the SNMP server for those variables, the SNMP server will pass the requests to the subagent, and the subagent will call the appropriate exit routine to generate the response data. In one embodiment, the exit routine will issue a CP DIAGNOSE Code X'26C'—Access Certain System Information routine and use the information returned from that to build a response packet containing VSWITCH MIB data.

A MIB Description File may have one or more exit tags that list the name of a MIB exit routine followed by a table containing the MIB variables that are supported by that exit routine. These MIB variables may be added to a MIB_DESC DATA file that is used by the SNMP agent. For this reason, a utility may be created to append the MIBs that are listed in the subagents MIB file to the MIB_DESC file. An assembler exit routine may provide an exit routine that provides MIB data for the subagent 16. In one embodiment, the exit will call the CP DIAGNOSE Code X'26C'—Access Certain System Information routine and use the information returned from that to build the MIB response packet.

In addition, the SNMP server needs to pass along virtual device identification information to the SNMP subagent 16. When a GET or GETNEXT request comes into the SNMP agent 18 that needs to be passed along to the SNMP subagent 16, it will pass along the destination IP address in its query packet that it sends over the DPI interface. This IP address will be passed along to the exit routine which will, in turn, call the DIAGNOSE to build the MIB response data.

Example of Operation

Figure 2:
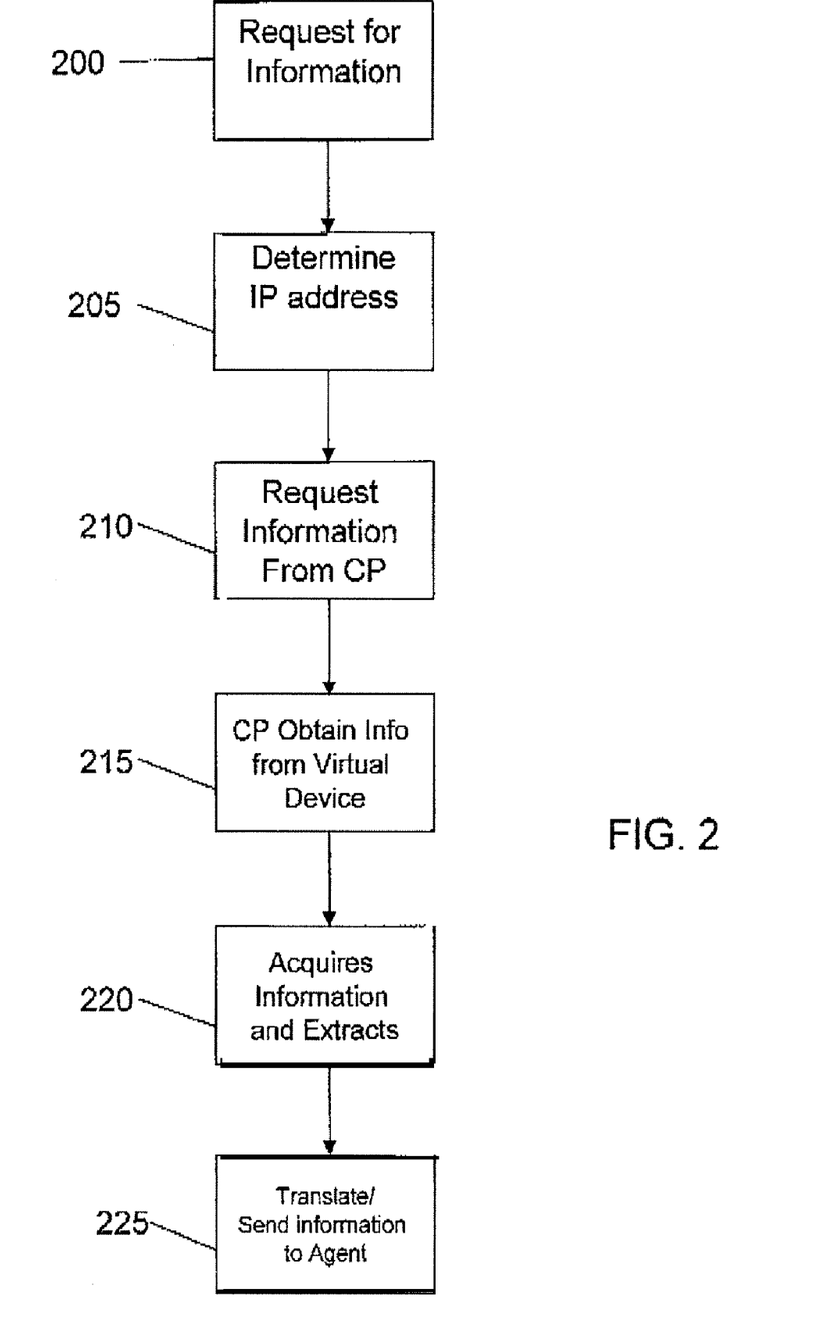
FIGS. 2, 3a-3c and 4 are flow charts of processing steps implementing aspects of the invention.
Figure 3A:
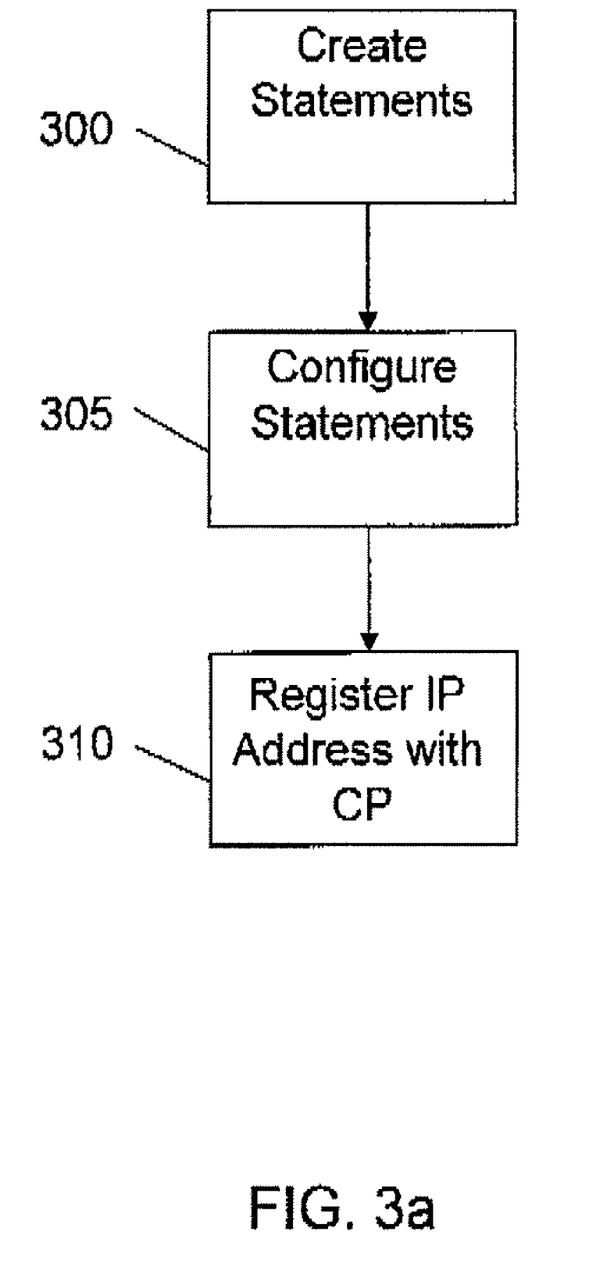
Figure 3B:
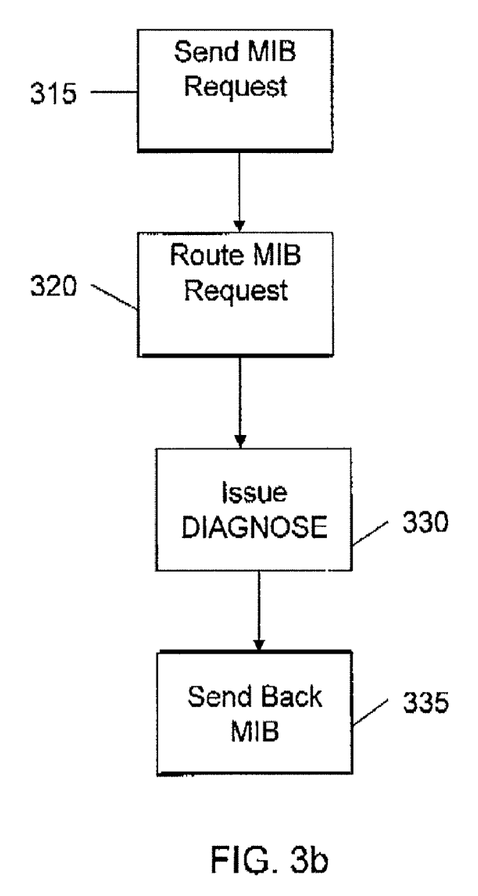
Figure 3C:
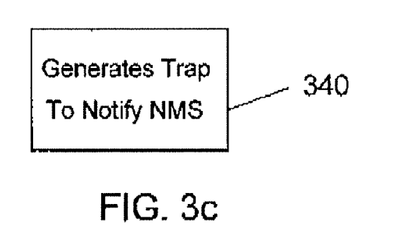
Figure 4:
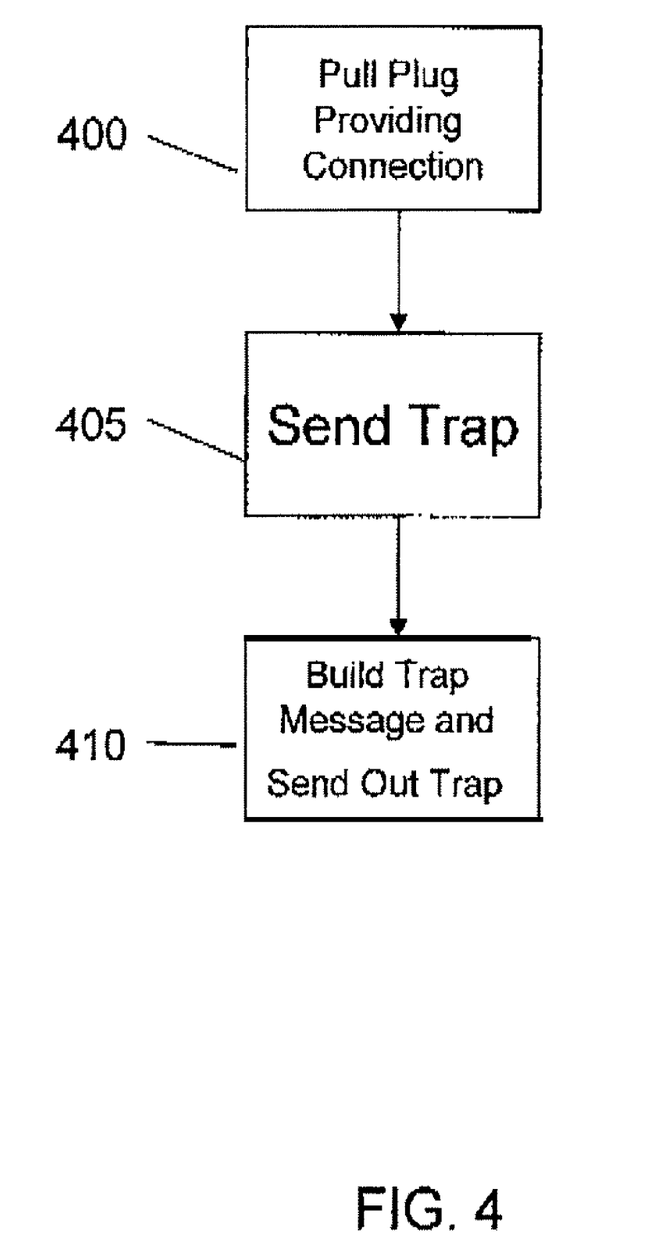

FIGS. 2-4 are flow diagrams implementing steps of the invention which may be implemented in the environment of FIG. 1. FIGS. 2-4 may equally represent a high-level block diagram of the invention. The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In FIG. 2, at step 200, an SNMP agent makes a request for information concerning a virtual device. As discussed above, the virtual device may be identified in a HOME statement in the TCP/IP configuration file. At step 205, the SNMP subagent determines the IP address of the virtual device (VSWITCH) for which the data is being requested. At step 210, the SNMP subagent will request the information from a control program implementing the virtual device. At step 215, the control program obtains information about the identified virtual device. The extracted information may be, for example, the pertinent, requested information in addition to extraneous information about the virtual device. At step 220, the SNMP subagent acquires the information and extracts the pertinent information about the virtual device. More specifically, the SNMP subagent 16 retrieves information about the virtual networking objects (devices) from the control program using interfaces typically written in assembly code. At step 225, the SNMP subagent will translate the pertinent information, create an SNMP response packet and send the response to the SNMP agent.

FIGS. 3a-3c shows additional process flows according to an aspect of the invention. At step 300, a Network Administrator creates DEVICE, LINK, START and HOME statements in the TCP/IP configuration file. The new "VSWITCH" keyword on the HOME statement indicates that the stack is providing management services (e.g., SNMP services) for the virtual device. At step 305, the administrator configures these statements so NMSs have connectivity to the SNMP service provided by the stack. That is, the stack on which SNMP is running has a HOME list entry that ties the VSWITCH name to an IP address. At step 310, TCP/IP stack initialization (or OBEY processing) registers the ip_address/VSWITCH_name associations with the control program using VSWITCH System Service.

At step 315, the NMS sends a request for Bridge MIBs for the VSWITCH.

In FIG. 3b, at step 320, the request is routed to the TCP/IP stack, which passes it to the SNMP server. At step 330, the subagent issues a DIAGNOSE using the IP address to obtain information about VSWITCH from the CP. The Bridge MIB is created from the DIAGNOSE response. At step 335, the MIB response is sent back out through the stack to the NMS.

In FIG. 3c, at step 340, a second function of SNMP generates traps to notify an NMS when the status of network objects change.

FIG. 4 is an example of how a trap works for the loss of a virtual connection. At step 400, a plug is pulled providing VSWITCH connection to the network. For example, in the z/VM operating system, the plug for the OSA-Express is pulled. At step 405, a trap event message containing the VSWITCH IP address is sent using VSWITCH to the stack handling SNMP requests for that virtual switch. At step 410, the TCP/IP stack builds the trap message from information provided in the VSWITCH message and uses standard stack interfaces to send out the trap.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims.

What is claimed is:

1. A system, comprising:
   a computing device;
   a configuration statement configured to provide an identity to a virtual device; and
   an SNMP subagent configured to interface between an SNMP (Simple Network Management Protocol) agent and a control program implementing the virtual device on the computing device, the SNMP subagent acquiring information extracted by the control program for the identified virtual device and providing the acquired information to the SNMP agent;
   the SNMP subagent being configured to translate pertinent information, create an SNMP response packet, and send the SNMP response packet to the SNMP agent,
   wherein the SNMP subagent acts as an extension of the SNMP agent and as an interface between the SNMP agent and the control program implementing the virtual device, and
   wherein the computing device creates DEVICE, LINK, START and HOME statements in a TCP/IP configuration file, wherein the HOME statement identifies the virtual device, and the HOME statement is configured to indicate that a stack is providing management services for the virtual device.

2. The system of claim 1, wherein the SNMP subagent is configured to extract pertinent information of the virtual device identified in the configuration statement.

3. The system of claim 2, wherein the SNMP subagent is configured to convert the extracted pertinent information into a meaningful response to a MIB request.

4. The system of claim 1, wherein the SNMP subagent is configured to handle requests for BRIDGE-MIB data for the virtual device identified in the configuration statement.

5. The system of claim 4, wherein the SNMP subagent is configured to register itself for handling BRIDGE-MIB data for the virtual device identified in the configuration statement.

6. The system of claim 1, wherein the SNMP subagent is configured to provide a TCP/IP interface for the virtual device in a hipervisor environment.

7. The method of claim 1, wherein the configuration statement is a TCP/IP configuration statement configured on a stack providing an SNMP service.

8. The system of claim 7, wherein the TCP/IP configuration statement is coded for an IPv4 or IPv6 address.

9. The system of claim 7, wherein the TCP/IP configuration statement is comparable to a TELNET address for a hardware device.

10. The system of claim 7, wherein the stack is separate from a virtual device connection to an external network.

11. The system of claim 1, wherein the control program accesses the information of the virtual device by use of a DIAGNOSE code.

12. The system of claim 1, wherein the virtual device is a virtual switch and the system is configured to receive an MIB request and build an MIB response.

13. The system of claim 1, wherein the SNMP response packet is generated by an exit routine of the SNMP subagent.

14. A method for deploying an application for managing a virtual device, comprising:
   providing a computer infrastructure being operable to:
      request information from a control program about a virtual device implemented by that control program;
      extract information about the virtual device obtained by the control program;
      translate, via an SNMP subagent, pertinent information; and
      create, via the SNMP subagent, an SNMP (Simple Network Management Protocol) response packet with the pertinent information and send the SNMP response packet to an SNMP agent,
   wherein the providing is initiated when an MIB request is received and builds an MIB response, and
   wherein the computer infrastructure creates DEVICE, LINK, START and HOME statements in a TCP/IP configuration file, wherein the HOME statement identifies the virtual device, and the HOME statement is configured to indicate that a stack is providing management services for the virtual device.

15. The method of claim 14, wherein the computer infrastructure is further operable to identify the virtual device in response to the MIB request over TCP/IP, wherein the identity of the virtual device is provided in a TCP/IP configuration statement.

16. The method of claim 14, wherein the computer infrastructure is further operable to extract the pertinent information from the information.

17. The method of claim 14, wherein the steps of claim 11 are provided on a subscription, advertising, and/or fee basis.

18. The method of claim 14, wherein the virtual device is a virtual switch and further comprising:
   utilizing an SNMP subagent to act as an extension of the SNMP agent and as an interface between the SNMP agent and the control program implementing the identified virtual device.

19. A method for deploying an application for managing a virtual device, comprising:
   providing a computer infrastructure being operable to:
      request information from a control program about a virtual device implemented by that control program;
      extract information about the virtual device obtained by the control program; and
      create an SNMP (Simple Network Management Protocol) response packet with pertinent information and send the SNMP response packet to an SNMP agent,
   wherein the computer infrastructure is further operable to create DEVICE, LINK, START and HOME statements in a TCP/IP configuration file, wherein the HOME statement identifies the virtual device, and
   wherein the HOME statement is configured to indicate that a stack is providing management services for the virtual device.

20. The method of claim 19, wherein the computer infrastructure is further operable to provide an IP address to a subagent.

21. The method of claim 20, wherein the computer infrastructure is further operable to issues a DIAGNOSE using the IP address to obtain information about the virtual device from the control program.

22. The method of claim 21, wherein the computer infrastructure is further operable to generate traps to notify a Network-Management System when a status of network objects change.

23. A computer program product comprising a non-transitory computer readable storage medium having readable program code embodied in the medium, the computer program product includes at least one component to:
   request information from a control program of an identified virtual device;
   extract information about the identified virtual device obtained by the control program;
   translate, via an SNMP subagent, pertinent information; and
   create, via the SNMP subagent, an SNMP (Simple Network Management Protocol) response packet with the pertinent information and send the SNMP response packet to an SNMP agent; and
   utilize an SNMP subagent to act as an extension of the SNMP agent and as an interface between the SNMP agent and the control program implementing the identified virtual device,
   wherein the computer program product includes at least one component to create DEVICE, LINK, START and HOME statements in a TCP/IP configuration file, wherein the HOME statement identifies the virtual device, and the HOME statement is configured to indicate that a stack is providing management services for the virtual device.

24. The computer program product of claim 23, wherein the request is an MIB request and the virtual device is a virtual switch, and further comprising:
   build an MIB response.

* * * * *